United States Patent [19]

Arai

[11] Patent Number: 4,883,150

[45] Date of Patent: Nov. 28, 1989

[54] HYDRAULIC SHOCK ABSORBER WITH PISTON ROD POSITION DETECTING MEANS

[75] Inventor: Susumu Arai, Kanagawa, Japan

[73] Assignee: Tokico Ltd., Kanagawa, Japan

[21] Appl. No.: 162,713

[22] Filed: Mar. 1, 1988

[30] Foreign Application Priority Data

Mar. 20, 1987 [JP] Japan .................................. 62-67050

[51] Int. Cl.⁴ ........................ F16F 9/48; F16D 66/00; G01B 7/14
[52] U.S. Cl. .................................. 188/289; 188/1.11; 280/DIG. 1; 324/208
[58] Field of Search .................. 188/299, 195, 322.21, 188/289, 317, 322.22, 1.11; 267/64.16, 64.18, 64.21, 64.24, 64.22, 64.28, DIG. 1; 280/6.1, 707, DIG. 1, 711, 714; 105/209, 210; 338/32 H; 91/390; 324/207, 208, 226

[56] References Cited

U.S. PATENT DOCUMENTS

| 2,224,306 | 12/1940 | Krueger | 267/64.22 |
|---|---|---|---|
| 2,559,633 | 7/1951 | Katz | 188/289 |
| 4,017,099 | 4/1977 | Hegel et al. | 280/707 |
| 4,095,682 | 6/1978 | Ostrowski | 188/289 |
| 4,150,299 | 4/1979 | Kasiewicz et al. | 280/707 X |
| 4,310,172 | 1/1982 | Claude et al. | 280/707 X |
| 4,502,006 | 2/1985 | Goodwin et al. | 324/208 |
| 4,638,670 | 1/1987 | Moser | 188/1.11 X |
| 4,650,042 | 3/1987 | Knecht et al. | 280/707 X |
| 4,655,440 | 4/1987 | Eckert | 280/707 X |
| 4,717,873 | 1/1988 | Carr et al. | 324/207 |
| 4,726,453 | 2/1988 | Obstfelder et al. | 188/299 X |

FOREIGN PATENT DOCUMENTS

| 2060157 | 6/1971 | Fed. Rep. of Germany | 267/64.16 |
|---|---|---|---|
| 3446411 | 7/1986 | Fed. Rep. of Germany | 280/6.1 |
| 0161609 | 9/1983 | Japan | 280/707 |
| 0125907 | 6/1986 | Japan | 188/299 |
| 2181838 | 4/1987 | United Kingdom | 280/707 |

Primary Examiner—Robert J. Oberleitner
Attorney, Agent, or Firm—Wenderoth, Lind & Ponack

[57] ABSTRACT

A hydraulic shock absorber is designed not only to support, for example, the body of a vehicle on an axle thereof, but also to adjust the level at which the body of the vehicle is disposed from the ground. The shock absorber has a shock absorber body, a piston axially slidably received in the body, and a piston rod having a hollow portion. The shock absorber further has a rod-shaped member secured at one end thereof to an inner portion of the shock absorber body and the other end thereof received in the hollow portion of the piston rod, and a detector for detecting a relative position of the piston rod and the rod-shaped member, the level detector being accommodated inside the piston rod. Accordingly, it is possible to prevent the occurrence of an erroneous detection and detect the level of the body of a vehicle with a high degree of accuracy.

6 Claims, 2 Drawing Sheets

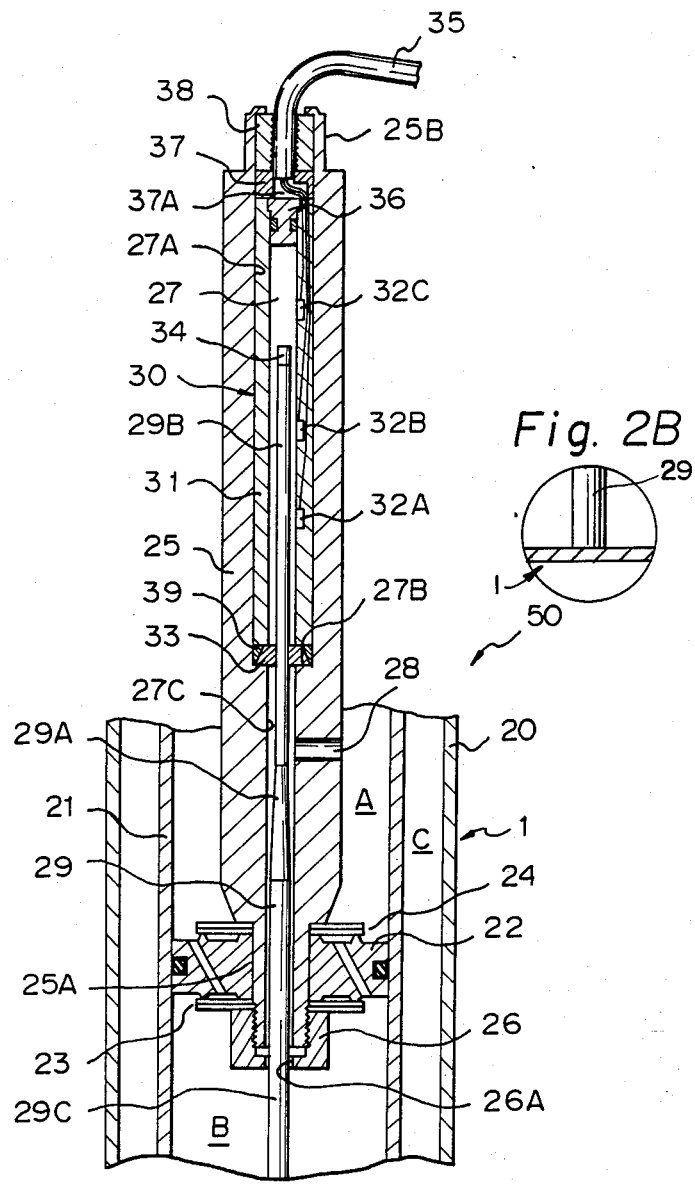

HYDRAULIC SHOCK ABSORBER WITH PISTON ROD POSITION DETECTING MEANS

BACKGROUND OF THE INVENTION

1. Field of the Invention

The present invention relates to a hydraulic shock absorber which may be suitably used not only to support, for example, the body of a vehicle on an axle thereof, but also to adjust the level at which the body of the vehicle is disposed from the ground. More particularly, the present invention pertains to a hydraulic shock absorber which includes a detector for detecting the amount by which the piston rod projects from the shock absorber body;

2. Description of the Prior Art

FIG. 1 shows a prior art hydraulic shock absorber.

In the figure reference numeral 1 denotes a body of a hydraulic shock absorber 50. A bracket 2 is rigidly secured to the lower end of the shock absorber body 1 for the purpose of mounting the shock absorber body 1 to an axle (not shown) of a vehicle. The bracket 2 is provided with mounting bores 2A for receiving bolts or the like. References numeral 3 denotes a piston rod which projects axially from the upper end of the shock absorber body 1. The diameter of the projecting end portion of the piston rod 3 is stepped in two stages to define a shoulder portion 3A and a small-diameter portion 3B. An inner bore 3C for supplying and discharging compressed air is provided in the projecting end portion of the piston rod 3, the bore 3C consisting of a first portion which extends axially from the upper end face of the small-diameter portion 3B and a second portion which extends radially. The piston rod 3 reciprocates relative to the shock absorber body 1 in response to vibrations of the vehicle when running so as to operate a piston received in the shock absorber body 1 to generate a damping force.

The reference numeral 4 denotes a shell which is rigidly secured at its proximal end 4A to the shoulder portion 3A of the piston rod 3 by means of a nut (not shown) so that the shell 4 is displaced together with the piston rod 3 in one unit. The shell 4 has the shape of a tube having its proximal end 4A closed so that the shell 4 surrounds the projecting end portion of the piston rod 3. The diameter of the shell 4 is smaller at its distal end portion than at its proximal end to thereby define a reduced-diameter portion 4B. Reference numeral 5 denotes a tubular member which is rigidly secured at its proximal end 5A to the outer periphery of the intermediate portion of the shock absorber body 1 by welding or other similar means. The tubular member 5 consists of a bottom portion 5B which extends radially outward from the proximal end 5A and a tubular portion 5C which extends axially upward from the outer peripheral edge of the bottom portion 5B to a location disposed above the upper end of the shock absorber body 1 so that the tubular portion 5C surrounds the body 1. Thus, the tubular member 5 is integral with the shock absorber body 1. The shell 4 and the tubular member 5 are eccentric with respect to both the shock absorber body 1 and the piston rod 3 in order to accommodate a sensor 12 (described later) in the space defined between the shell 4 and the tubular member 5.

Reference numeral 6 denotes a rubber member which cooperates with the shell 4 and the tubular member 5 to define an air chamber 7 therein. The rubber member 6 is bent at its intermediate portion 6A so as to have a substantially U-shaped cross section. The outer peripheral edge 6B is hermetically secured to the reduced-diameter portion 4B of the shell 4 by means of a ring 8, while the inner peripheral edge 6C is hermetically secured to the distal end of the tubular portion 5C of the tubular member 5 by means of a ring 9. The rubber member 6 is elastically deformable, thereby enabling the shell 4 and the tubular member 5 to move toward and away from each other in response to the retraction and extension of the piston rod 3. Reference numeral 10 denotes a rubber stopper which is disposed around the projecting end portion of the piston rod 3, and 11 a passage which is provided at the upper end of the rubber stopper 10 and extends radially. The passage communicates with the inner bore 3C to supply and discharge compressed air to and from the air chamber 7 through the inner bore 3C. Thus, the air chamber 7 is expanded or contracted under the action of compressed air supplied to or discharged from the air chamber 7 through the passage 11 to cause the shell 4 to move upward or downward in accordance with the level of pressure inside the air chamber 7, thereby controlling the amount by which the piston rod 3 projects from the shock absorber body 1, and thus appropriately adjusting the level at which the vehicle body is disposed with respect to the ground.

The reference numeral 12 denotes a sensor which is disposed inside the air chamber 7 to detect the level of the vehicle in accordance with the degree of expansion or contraction of the air chamber 7. The sensor 12 comprises a rod 13 which is hermetically secured at one end 13A thereof to the proximal end 4A of the shell 4 and which extends axially downward inside the air chamber 7 with the other end 13B being a free end, and a plurality of (e.g., three) reed switches 14A, 14B, 14C serving as sensor elements which are disposed at predetermined intervals inside the rod 13 between the ends 13A and 13B. Each of the reed switches 14A, 14B, 14C is activated when approaching a magnet 17 (described later) so as to output, through a lead wire 15, a signal representative of the level of the vehicle that is, a signal used to detect whether the body of the vehicle is disposed at a high position, an intermediate position or a low position with respect to the ground. The rod 13 extends axially inside the air chamber 7 so that, even when the body of the vehicle is at the high position as exemplarily shown in the figure, the lower end 13B is below the magnet 17 which is provided at the upper end of the shock absorber body 1.

Reference numeral 16 denotes an L-shaped supporting bracket which is provided at the upper end of the shock absorber body 1, and the magnet 17 serves as an object to be detected which is secured to the upper side of the supporting bracket 16. The magnet 17 is disposed at substantially the same level as the upper end of the shock absorber body 1 so that the magnet 17 is in close proximity with the rod 13. The magnet 17 is adapted such that, when a reed switch 14A, 14B or 14C approaches it in response to the contraction or expansion of the air chamber 7, the magnet 17 causes the contacts of the reed switch to close so as to output a signal representative of the detected level of the vehicle. The magnet 17 is disposed at a location in which there is no possibility that the magnet 17 will come into contact with the rubber stopper 10 or the proximal end 4A of the shell 4 when the piston rod 3 is retracted. In addition, reference numeral 18 denotes a rubber stopper receiver which is rigidly secured to the upper end of shock absorber body 1 by welding or other similar means to contact the rubber stopper 10.

In the hydraulic shock absorber arranged as described above, the bracket 2 is secured to an axle of a vehicle, while the small-diameter portion 3B of the piston rod 3 is secured to the body of the vehicle, thereby supporting the body and also enabling the level of the body of the vehicle to be appropriately adjusted by supplying or discharging compressed air to or from the air chamber 7, as described above. More specifically, dry compressed air is supplied from a compressed air tank (not shown) into the air chamber 7 or discharged therefrom through the inner bore 3C and the passage 11 to expand or contract the air chamber 7, thereby controlling the amount by which the piston rod 3 projects from the shock absorber body 1, and thus appropriately adjusting the level of the vehicle.

When the vehicle is at the high position as illustrated, the reed switch 14 A is closet to the magnet 17, and therefore the reed switch 14A is activated to output a signal representative of the fact that the vehicle is at the high position. When the compressed air inside the air chamber 7 is discharged through the passage 11 and the inner bore 3C to thereby contract the air chamber 7, the piston rod 3 is retracted. Accordingly, the rod 13 of the sensor 12 moves axially downward, and the reed switch 14B confronts the magnet 17. Therefore, the reed switch 14B is activated to output a signal representative of the fact that the vehicle is at the intermediate position. When the reed switch 14C confronts the magnet 17, it is activated to output a signal representative of the fact that the vehicle is at the low position.

The above-described prior art shock absorber suffers, however, from the following problems. The rod 13 of the sensor 12 which constitutes the level detector extends axially inside the air chamber 7 and the rod 3 is supported only at one end 13A thereof in a cantilever fashion by the proximal end portion 4A of the shell 4. Accordingly, if the shell 4 oscillates sideward when the piston rod 3 is extended or retracted, the lower end 13B of the rod 13 oscillates sideward to a substantial extent. In such a case, when the reed switch 14A, 14B or 14C confronts the magnet 17, the predetermined distance between the reed switch and the magnet 17 changes. Therefore, an erroneous detection is likely to occur. Furthermore, a bore for facilitating the mounting of the end 13A of the rod 13 must be provided in the proximal end portion 4A of the shell 4, and the presence of this mounting bore an contribute to the disadvantage of compressed air in the air chamber 7 leaking out through the area between the outer periphery of the rod 13 and the peripheral edge defining the bore, and it is therefore difficult to ensure airtightness.

SUMMARY OF THE INVENTION

In view of the above-described disadvantages of the prior art, it is a primary object of the present invention to provide a hydraulic shock absorber wherein a level detector is accommodated inside a piston rod to thereby prevent the occurrence of an erroneous detection and ensure an airtight air chamber.

To this end, the present invention provides a hydraulic shock absorber which comprises a piston rod having an axial bore extending axially therethrough, a rod-shaped member having a lower end secured to the bottom of the shock absorber body and an upper end portion received in the axial bore provided in the piston rod, and a level detector provided on the rod-shaped member and/or the wall of the axial bore in the piston rod to detect a level of the body of the vehicle on the basis of the relative position of the rod-shaped member and the piston rod.

When the level of the body of the vehicle changes, the piston rod is extended from the upper end of the shock absorber body or is retracted into the body, and therefore the relative position of the piston rod and the rod-shaped member also changes. Thus, the level detector provided on at least one of the two elements, i.e., the rod-shaped member and the wall of the axial bore in the piston rod, is able to detect the level of the body of the vehicle on the basis of the relative position of the piston rod and the rod-shaped member.

The above and other objects, features and advantages of the present invention will become more apparent from the following description of the preferred embodiment thereof taken in conjunction with the accompanying drawings.

BRIEF DESCRIPTION OF THE DRAWINGS

FIG. 2A is a fragmentary sectional·view showing an essential part of one embodiment of the hydraulic shock absorber according to the present invention, and FIG. 2B is a schematic diagram, on an enlarged scale, showing an end of the rod-shaped member depicted in FIG. 2A that is attached to the bottom of the shock absorber body.

DETAILED DESCRIPTION OF THE PREFERRED EMBODIMENT

Figure 1:
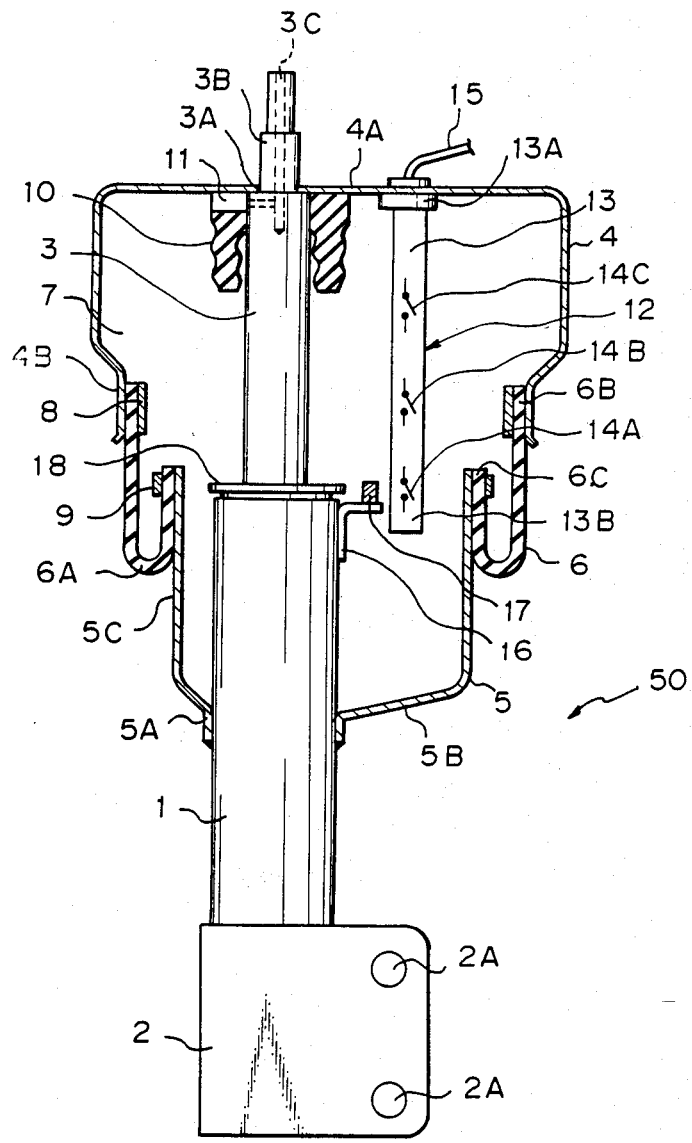
FIG. 1 is a vertical sectional view of a hydraulic shock absorber according to the prior art.

One embodiment of the present invention will be described hereinunder in detail with reference to FIG. 2. It should be noted that FIG. 2A shows clearly only the features of this embodiment and, since constituent elements that are not shown may be the same as those in the prior art shown in FIG. 1, these elements are denoted by the same reference numerals as those shown in FIG. 1 and a detailed description thereof is omitted.

In the figure, the reference numerals 20 and 21 denote outer and inner cylinders, respectively, which are disposed coaxially to constitute a shock absorber body 1. The numeral 22 denotes a piston which is slidably received in the inner cylinder 21. The piston 22 defines two oil chambers A and B inside the inner cylinder 21. The lower oil chamber B communicates with an annular oil chamber C defined between the outer and inner cylinders 20, 21 through a throttle passage (not shown). The piston 22 is provided with expansion-side and contraction-side damping force generating mechanisms 23, 24 which are arranged to generate a damping force when a piston rod 25 (described later) is extended and retracted, respectively. Since the arrangement of the damping force generating mechanisms 23, 24 is well known in the art and is not related to the subject matter of the invention of this application, a detailed description thereof is omitted.

The reference numeral 25 denotes a piston rod having a reduced-diameter portion 25A provided at its lower end. The reduced-diameter portion 25A is rigidly secured to the piston 22 through a piston nut 26. The upper end portion of the piston rod 25 projects axially from the shock absorber body 1 in the same way as in the case of the piston rod 3 of the prior art. A small-diameter portion 25B is provided at the projecting end of the piston rod 25 for the purpose of securing the piston rod 25 to, for example, the body of a vehicle. Between the projecting end of the piston rod 25 and the shock absorber body 1, and air chamber 7 (see FIG. 1) is defined by a shell 4, a rubber member 6, etc. in substantially the same way as in the prior art. The shell 4 is provided with a valve or the like (not shown) for supplying and discharging compressed air.

Reference numeral 27 denotes an axial bore defining a hollow portion of the piston rod and extending axially through the piston rod 25. The axial bore 27 consists of a large-diameter bore 27A which is defined in the upper portion of the piston rod 25 and a small-diameter bore 27C which extends downward from the lower end of the large-diameter bore 27A, through a step portion 27B, in coaxial relation to the bore 27A and terminates at an orifice of the piston rod. A detector body 31 (described later) is disposed in the large-diameter bore 27A. Reference numeral 28 denotes a radial oil bore extending in the piston rod 25 in communication with the the small-diameter bore 27C of the axial bore 27. The oil bore 28 places the oil chambers A and B in communication via the small-diameter bore 27C and other portions, as described below.

Reference numeral 29 denotes a metering pin compresing a rod-shaped member which is secured at its lower end to the bottom of the shock absorber body 1 (FIG. 2B). The metering pin 29 is inserted into the axial bore 27 in the piston rod 25 through an orifice bore 26A formed in the lower end of the piston nut 26. The intermediate portion of the metering pin 29 is tapered to define a taper portion 29A. That portion of the metering pin 29 which extends upward from the upper end of the taper portion 29A comprises a small-diameter shaft portion 29B, while the portion of the metering pin 29 which extends downward from the lower end of the taper portion 29A comprises a large-diameter shaft portion 29C. As is clear from the figure, the diameter of the large-diameter shaft portion 29C is smaller than those of the small-diameter bore portion 27C in the piston rod 25 and the orifice bore 26A in the piston nut 26. Accordingly, the radial oil bore 28, the small-diameter bore 27C and the orifice bore 26A cooperate with each other to define a communicating passage which places the oil chambers A and B in communication.

The hydraulic shock absorber 50 operates when the vehicle is running. When the speed of movement of the piston 22 is relatively low, the fluid in the oil chambers A and B passes mainly through the above-described communicating passage and the magnitude of damping force generated at that time is established by the effective cross-sectional area of the orifice bore 26A. However, when the speed of movement of the piston 22 increases, the damping force generating mechanisms 23, 24 provided on the piston 22 are activated. It should be noted that, since the metering pin 29 comprises the large-diameter shaft portion 29C, the taper portion 29A and the small-diameter shaft portion 29B as described above, when the metering pin 29 is displaced relative to the piston rod 25, that is, when the level of the body of the vehicle changes, the effective cross-sectional area of the orifice bore 26A changes. Accordingly, the magnitude of the damping force generated when the speed of movement of the piston 22 is relatively low is adjusted in conformity with the level of the vehicle.

Reference numeral 30 denotes a level detector which is provided in the large-diameter bore 27A of the axial bore 27. The level detector 30 comprises a detector body 31 which has a tubular shape, comprises a resin or the like, and which has an outer diameter equal to the diameter of the large-diameter bore 27A and an inner diameter substantially equal to the diameter of the small-diameter bore 27C, a plurality of (e.g., three) reed switches 32A, 32B, 32C which are embedded in the detector body 31 and are spaced apart at predetermined intervals in the axial direction of the body 31, and a magnet 34 (described later). The reed switches 32A, 32B, 32C are the same type as the reed switches 14A, 14B, 14C of the described prior art. The lower end of the detector body 31 of the level detector 30 is positioned on the step portion 27B of the axial bore 27 through a tubular guide 33 which axially support the small-diameter shaft portion 29B of the metering pin 29 which extends into the detector body 31.

Reference numeral 34 denotes a magnet which is provided at the distal end of the small-diameter shaft portion 29B of the metering pin 29 to constitute a part of the level detector 30. The magnet 34 is adapted such that, when the relative position of the piston rod 25 and the metering pin 29 changes as a result of the extension or retraction of the piston rod 25, the magnet 34 confront magnetically actuatable reed switch 32A, 32B or 32C of the detector body 31 to close it, thus causing said reed switch to output, through a lead wire 35, a signal representative of a detected level of the vehicle. The lead wire 35 extends out of the piston rod 25 from the upper end of the small-diameter portion 25B through a lead wire guide 38 (described later).

Reference numeral 36 denotes a plug which is fitted into the upper end of the detector body 31 to close said upper end through an O-ring or the like to thereby prevent the oil inside the shock absorber 50 from leaking out through the level detector 30 in cooperation with a sealing member (O-ring 39) which is disposed around the outer peripheral portion of the guide 33. Reference numeral 37 denotes a tubular spacer which is fitted into the upper end of the large-diameter bore portion 27A of the axial bore 27 so as to be disposed at the upper side of the detector body 31. The lead wire guide 38 is rigidly secured in the large-diameter bore portion 27A at the upper side of the spacer 37 by means, for example, of caulking. The lead wire guide 38 is adapted to guide, out of the piston rod 25, the lead wires 35 which extend to a space 37A in the spacer 37 from the respective reed switches 32A, 32B and 32C. The lead wire guide 38 also functions to position the detector body 31 in the large-diameter bore 27A of the axial bore 27 between the spacer 37 and the guide 33.

The hydraulic shock absorber according to this embodiment has the above-described arrangement and the basic operation thereof is not particularly different from that of the prior art.

In this embodiment, however, the axial bore 27 is provided in the piston rod 25, and the detector body 31 of the level detector 30 is mounted in the large-diameter bore 27A of the axial bore 27. Furthermore, the magnet 34 is attached to the distal end of the small-diameter shaft portion 29B of the metering pin 29 which extends axially through the detector body 31, so that a change in the relative position of the metering pin 29 and the piston rod 25 results in a signal representative of a change in the level of the vehicle being issued by one of the reed switches 32A, 32B, 32C provided on the detector body 31. Accordingly it is possible to eliminate possibility of a change in the set distance between the magnet 34 and the reed switches 32A, 32B, 32C of the level detector 30 at the time extension or retraction of the piston rod 25. It is therefore possible to prevent the occurrence of an erroneous detection and thus detect the level of the body at the vehicle with a high degree of accuracy. Even if the piston rod 25, when being extended or retracted were to oscillate sideward, since the small-diameter shaft portion 29B of the metering pin 29 is supported by the guide 33, the magnet 34 would oscillate sideward together with the detector body 31. Accordingly, it is possible to maintain the above-described set distance at a constant value at all times and therefore it is possible to increase the degree of accuracy of the detection.

Since the level detector 30 is accommodated inside the piston rod 25, it is unnecessary to provide the shell 4 with a sensor mounting bore such as the bore for mounting the sensor 12 which has heretofore been needed in the prior art. Thus, it is possible to ensure airtightness for the air chamber 7 even more readily and reliably than in the prior art. Furthermore, it is possible to prevent the leakage of oil in the axial bore 27 provided in the piston rod 25 with a simple seal structure comprising the guide 33, the plug 36, etc.

Although in the above-described embodiment the taper portion 29A is formed at the intermediate portion of the metering pin 29 and the small-diameter shaft portion 29B is formed at the upper side of the taper portion 29A, the configuration of the metering pin 29 is not necessarily limited thereto, and it is, of course, possible to employ a metering pin having a different configuration. Furthermore, the rod-shaped member is not necessarily limited to being metering pin 29. For example, a relatively long and narrow rod-shaped member having a predetermined diameter may be employed instead of the metering pin 29.

Although in the described embodiment the level detector 30 comprises the reed switches 32A, 32B, 32C, the arrangement of the level detector 30 is not necessarily limited thereto, and it is possible to employ any type of detector, for example, an optical detector, an electrostatic capacity type detector, or a detector that comprises magnetoresistive elements. In the case of an optical or electrostatic capacity type detector, the magnet 34 can be omitted.

It is not always necessary to form the level detector 30 from the tubular detector body 31 and the other elements described above. For example, the level detector 30 may an infrared or ultrasonic detector disposed at the upper end of the large-diameter bore portion 27A of the axial bore 27 to detect a relative position of a rod-shaped member, e.g., the metering pin 29, and the piston rod 25 on the basis of a wave reflected from the upper end face of the rod-shaped member.

Although in the described embodiment the detector body 31 of the level detector 30 is mounted on the wall of the axial bore 27, the arrangement may also be such that detecting elements, e.g., the reed switches 32A to 32C, are mounted on the rod-shaped member, e.g., the metering pin 29, and the magnet 34 is secured to the wall of the large-diameter bore 27A of the axial bore 27.

As has been described above in detail, according to the present invention, a rod-shaped member is received in an axial bore provided in a piston rod, and a level detector is provided on at least one of the two elements, i.e., the rod-shaped member or the wall of the axial bore, to detect the level of the body of the vehicle based on the relative position of the rod-shaped member and the piston rod. Accordingly, there is no possibility of the distance of the piston rod relative to the level detector changing when the piston rod is extended or retracted, and therefore it is possible to prevent the occurrence of an erroneous detection or other failures, resulting in enhanced reliability. Thus, it is possible to detect the level of the body of the vehicle with a high degree of accuracy and also to ensure airtightness for the air chamber with ease.

Although the present invention has been described in specific terms, it should be noted here that the described embodiment is not necessarily exclusive and various changes and modifications may be imparted thereto without departing from the scope of the invention which is limited solely by the appended claims.

What is claimed is:

1. A hydraulic shock absorber comprising:
a shock absorber body;
a piston disposed within said shock absorber body and slidable therein,
two fluid-receiving chambers being defined in said shock absorber body on opposite sides of said piston, respectively;
a piston rod having one end thereof connected to said piston and the other end thereof projecting from said shock absorber body,
said piston rod including an orifice, a hollow portion the interior of which is open to said orifice, and a radial bore open to the interior of said hollow portion and one of said fluid-receiving chambers,
said fluid-receiving chambers being in fluid communication via said radial bore, the interior of said hollow portion and said orifice;
a rod-shaped member having one end thereof secured to said shock absorber body at an inner portion thereof and extending in an axial direction through said orifice,
said rod-shaped member having a cross-sectional area that varies as taken along said axial direction so as to regulate the flow of fluid from said one of said fluid-receiving chambers to the other of said fluid-receiving chambers to a degree corresponding to the relative position of said orifice and said rod-shaped member; and
detector means for detecting the relative position of said piston rod and said rod-shaped member,
said detector means including a detector body having a tubular shape a magnet integral with said rod-shaped member, and a plurality of magnetically actuatable switches embedded in said detector body and spaced apart at predetermined intervals in the axial direction of the detector body,
said detector body disposed in said piston rod in the hollow portion thereof, and said rod-shaped member extending within said detector body.

2. A hydraulic shock absorber as claimed in claim 1, wherein said rod-shaped member includes a portion that tapers toward the other end thereof.

3. A hydraulic shock absorber as claimed in claim 1, wherein the hollow portion of said piston rod is defined by a large-diameter bore extending in said piston rod from the other end of the piston rod, and the diameter of said large-diameter bore being substantially equal to the outer diameter of said tubular detector body.

4. A hydraulic shock absorber as claimed in claim 3, wherein the hollow portion of said piston rod is defined by a step portion located at an inner end of said large-diameter bore, and further comprising a sealing member located between said detector body and said step portion.

5. A hydraulic shock absorber as claimed in claim 1, and further comprising a guide disposed at an inner end of the detector body for axially slidably supporting said rod-shaped member.

6. A hydraulic shock absorber as claimed in claim 1, wherein each of said magnetically actuatable switches is a reed switch.

* * * * *